_United States Patent_ [19]

Gurevich et al.

[11] 3,883,713

[45] May 13, 1975

[54] FLUX CORED ELECTRODE

[76] Inventors: Samuil Gurevich, ulitsa Kioto, 9, kv. 89; Vadim Nikolaevich Zamkov, ulitsa Stanislavskogo, 3, kv. 4; Valery Pavlovich Prilutsky, ulitsa Melnikova, 48, kv. 6; Vladimir Filippovich Topolsky, Bulvar Lesi Ukrainki, 3, kv. 2; Nikolai Vasilievich Podkopai, Bulvar Lesi Ukrainki, 2, kv. 8; Semen Leonidovich Dykhno, ulitsa Nkolsko-Botanicheskava, 15/17, kv. 4; Sergei Afanasievich Manoilo, ulitsa Demuana Bednogo, 12, kv. 33, all of Kiev, U.S.S.R.

[22] Filed: Apr. 25, 1973

[21] Appl. No.: 354,438

[52] U.S. Cl. ............................................. 219/146
[51] Int. Cl. ........................................... B23k 35/22
[58] Field of Search ............. 219/145, 146, 74, 137

[56] References Cited
UNITED STATES PATENTS

| | | | |
|---|---|---|---|
| 2,552,105 | 5/1951 | Miller et al. | 219/146 X |
| 3,531,620 | 9/1970 | Arikawa et al. | 219/146 |
| 3,566,073 | 2/1971 | Black | 219/146 |

_Primary Examiner_—J. V. Truhe
_Assistant Examiner_—G. R. Peterson
_Attorney, Agent, or Firm_—Holman & Stern

[57] ABSTRACT

A flux-cored electrode is intended for welding high-heat metals, e.g., titanium and its alloys, in a protective atmosphere, and consists of a metal casing made from titanium or its alloys and a flux core. The flux core contains calcium, magnesium and strontium fluorides in the following percentages by weight;

$CaF_2$ 25–52
$MgF_2$ 45–60
$SrF_2$ 3–15.

3 Claims, No Drawings

FLUX CORED ELECTRODE

The present invention relates to welding production and more particularly to flux-cored electrodes for the welding of high-heat metals.

The present invention can be most effective when used for the welding of titanium and its alloys by means of a non-consumable electrode in a protective atmosphere.

A flux-cored electrode made up of a metal (iron) casing and a flux core containing rutile, calcium fluoride, aluminum, titanium, zirconium, manganese, nickel, and arc stabilizers is known in the art. Such an electrode is intended for steel welding (cf., British Patent No. 1,143,600). Said electrode cannot be used for welding titanium and its alloys in a protective atmosphere, as it contains such elements as iron, nickel, and manganese that, when used for the welding of titanium, form intermetallic compounds with it, making the weld joint brittle. The presence of titanium dioxide (rutile) also results in a deterioration of the mechanical properties of the weld joint. Thus, by using the flux-cored electrode of the above composition for titanium welding, it is impossible to secure a quality weld.

Also known is a tubular electrode comprising a casing made of a low-carbon steel and a core containing arc stabilizers such as rutile, fluorite, and carbonates as well as aluminum, nickel, manganese, and graphite. Said tubular electrode is used without additional outer protection of the arc and intended for obtaining a hard-facing weld metal.

The above tubular electrode cannot be used for welding titanium in a protective atmosphere, as it has such elements in its composition as iron, manganese, nickel, and aluminum that form, together with it, intermetallic compounds which make the weld joint brittle. Moreover, the presence of rutile and oxygen-containing carbonates in the core also contribute to obtaining a weld joint featuring increased brittleness.

Thus, the weld obtained with the use of the above electrode would feature low mechanical characteristics, specifically low impact strength and zero plasticity.

The object of the present invention is to provide a flux-cored electrode whose use for welding high-heat metals would help increase labor efficiency.

Another object of the present invention is to provide a flux-cored electrode whose use would help improve the quality of the weld and the weld joint.

Yet another object of the present invention is to provide a flux-cored electrode whose use would help reduce residual weld deformations and welded articles distortions.

These and other objects of the invention are achieved by the fact that in a flux-cored electrode for the fuse welding of metals in a protective atmosphere, comprising a metal casing and a flux core of fluorine containing compounds, according to the invention, the metal casing is made of titanium or its alloys, while the flux core contains (in per cent weight):
 calcium fluoride 25–52
 magnesium fluoride 45–60
 strontium fluoride 3–15.

In another exemplary embodiment of the invention, the relation of the weight of the flux core to the weight of the metallic casing is within 1-1.3:1.

The ratio between the weight of the flux and that of the metal casing is selected such as to ensure the maximum use of the heat power of the arc for obtaining a quality weld joint.

Variations in the cited ratio of the weights of the flux core and the metal casing, e.g., a reduction in the flux content, always result in a decreased efficiency of the use of the arc heat power.

Said flux-cored electrode, if provided, permits the welding of high-heat metals, e.g., titanium or its alloys, as thick as 16 mm per run. Moreover, the operation is butt welding which requires no preliminary bevelling enables reduction in costs for the mechanical preparation of the butt to be welded.

A full-sized weld secured per one run permits avoidance of the use of additives, which helps improve the quality of the weld and save welding materials. A 1.5–2 times reduction in the welding current and, accordingly, a reduction in the amount of the heat introduced during welding considerably reduces welding deformations.

Decrease in the width of the seam and a reduced thermal zone largely facilitate the protection of both the molten metal and the heating zone, which simplifies the welding operation.

Interaction of the flux core with the molten metal improves the quality of the weld owing to the complete absence of pores in the joint. Welding by means of the flux-cored electrode does not require special equipment and can be done on standard-type welding equipment.

Flux-cored electrodes can be used for welding seams of intricate shape through manual arcing both in the open and in chambers with controlled atmosphere.

Other objects and advantages of the invention will be more apparent from the detailed description of its exemplary embodiments based on the use of titanium and its alloys.

EXAMPLE 1

Welding of parts from titanium low-alloy compounds 5 to 7 mm thick, without bevelling, is done by means of flux-cored electrodes 2–2.2 mm in diameter. The relation of the flux core weight to the weight of the titanium-made casing is 1–1.1:1. The flux core has the following composition (in per cent by weight):
 calcium fluoride 52%
 magnesium fluoride 45%
 strontium fluoride 3%

EXAMPLE 2

Welding of parts from titanium low-alloy compounds 8 to 12 mm thick, without bevelling, is done by means of flux-cored electrodes 2.8–3 mm in diameter. The relation of the flux core to the titanium-made casing is 1.1–1.2:1. The flux core has the following composition (in per cent by weight):
 calcium fluoride 42%
 magnesium fluoride 50%
 strontium fluoride 8%

EXAMPLE 3.

Welding of parts from titanium low-alloy compounds 13 to 16 mm thick, without bevelling, is done by means of flux-cored electrodes 3–3.5 mm in diameter. The relation of the weight of the flux core to the weight of the titanium casing is 1.2-1.3:1. The flux core has the following composition (in weight per cent):
calcium fluoride 25%
magnesium fluoride 60%
strontium fluoride 15%

EXAMPLE 4.

When welding parts from technical titanium up to 16 mm thick, the flux core of the flux-cored electrode may have the following composition (in per cent by weight):
calcium fluoride 35%
magnesium fluoride 55%
strontium fluoride 10%

EXAMPLE 5.

When welding titanium alloys 5 mm thick, that contain molybdenum or niobium, the flux core of the related electrode may have the following composition (in per cent by weight):
calcium fluoride 40%
magnesium fluoride 55%
strontium fluoride 5%

The diameter of the flux-cored electrode is 2 mm.

The relation of the flux core weight to the weight of the titanium casing is 1-1.1:1.

The flux-cored electrode is made on a special machine with a controllable drawing rate, with no special greases used.

The casing of the flux-cored electrode is prepared from titanium and its alloys, while the flux core consists of particles whose size does not exceed 0.05-0.06 mm.

When welding titanium or its alloys by means of a non-consumable electrode in a protective atmosphere, the flux-cored electrode is fed to the arcing zone in the same manner as is a common-type adding electrode at a rate being within the rate of welding.

What we claim is:

1. A flux-cored electrode for the fuse welding of metals in a protective atmosphere, comprising: a metal casing made from titanium or its alloys and a flux core which contains in per cent by weight:
calcium fluoride 25-52
magnesium fluoride 45-60
strontium 3-15.

2. A flux-cored electrode claim in Claim 1, wherein the relation of the weight of the flux core to the weight of the metal casing is within 1-1.3:1.

3. A flux-cored electrode as claimed in claim 1, wherein said flux core consists of particles of a size up to 0.06 mm.

* * * * *